United States Patent [19]

Hardgrove et al.

[11] Patent Number: 5,407,092
[45] Date of Patent: Apr. 18, 1995

[54] PROFILED THICKNESS BONDED ROLLING DIAPHRAGM TANK

[75] Inventors: John A. Hardgrove, Manhattan Beach; Pamela S. Adney; Scott J. Rotenberger, both of Redondo Beach, all of Calif.

[73] Assignee: TRW Inc., Redondo Beach, Calif.

[21] Appl. No.: 118,105

[22] Filed: Sep. 8, 1993

[51] Int. Cl.⁶ .............................................. B65D 8/08
[52] U.S. Cl. .................................... 220/590; 220/721; 220/723; 222/130
[58] Field of Search ............... 220/720, 721, 722, 723, 220/581, 585, 586, 588, 589; 222/130, 389, 541

[56] References Cited

U.S. PATENT DOCUMENTS

| | | | |
|---|---|---|---|
| 2,445,268 | 7/1948 | Hodgins | 220/653 |
| 3,000,542 | 9/1961 | Longenfeld et al. | 222/389 |
| 4,561,568 | 12/1985 | Hoffmeister et al. | 222/130 |
| 4,588,622 | 5/1986 | Sukarie | 220/590 |
| 5,025,943 | 6/1991 | Forsman | 220/590 |

*Primary Examiner*—Joseph Man-Fu Moy

[57] ABSTRACT

A liquid propellant tank of the rolling bonded diaphragm type used for missile propulsion systems contains a flexible piston that is formed together with the outer tank diaphragm in a unitary one piece assembly.

9 Claims, 2 Drawing Sheets

PROFILED THICKNESS BONDED ROLLING DIAPHRAGM TANK

FIELD OF THE INVENTION

This invention relates to expendable propellant storage tanks for rocket propelled missiles and like armament and, more particularly, to bonded rolling diaphragm type propellant tanks.

BACKGROUND

Munitions carrying missiles achieve flight and are propelled at high velocities by the thrust of expanding gases created by a hypergolic reaction between a fuel and an oxidizer, the propellants, released from reservoirs or storage tanks, as variously termed, carried by the missile. Hence, the propellant storage tanks form a necessary component of a weapon carrying missile, more particularly, of the missile's propulsion system. Propellant storage tanks for the foregoing application are intended for a single use and, hence, are expendable in application. The tank for storing the fuel, such as Hydrazine, $N_2H_4$, is substantially the same tank structure to store the accompanying Oxidizer, $N_2O_4$, with which the fuel reacts both of which are known propellants. The effectiveness of the missile depends not only on the quantity of propellant carried, which is related in part to the missiles intended target range, but also upon the means by which the propellant is effectively extracted from the storeage reservoir and efficiently consumed. The storage tank's cost of manufacture, volume efficiency and weight are important considerations in tank design.

Propellant storage tanks for the foregoing missile application must not only withstand high internal pressures with limited radial and axial expansion, but must be light in weight. Typically the propellant tank is formed of a relatively thin thickness of light weight metal, such as Aluminum. To provide greater strength an outer wrap of graphite composite material, which is also very light in weight, is applied to the outside surface of the tank. In forming the wrap, graphite strip material is wound around the outer surface of the tank on all sides. Typically that wrap is formed in two layers; the first is known as a helical wrap and the second wrap, overlying the helical wrap, is known as the hoop wrap. The use of such composite wrap dictates the tank's shape: a cylindrical central section having relatively rounded or dome shaped front and back ends, more specifically ends that are sections of an oblate spheroid. The tank cannot be of a simple "oil drum" shape with flat ends.

In a typical propulsion system of the foregoing type, a gas, stored under high pressure in a separate reservoir, provides the necessary force to force the propellants, whether liquid or gel, out of the respective storage tanks. During operation, when that gas is applied to the propellant tank's inlet, located in the center of one of the dome shaped ends of the tank, the gas pressure is applied to the back side of an internal dome shaped piston. That pressure releases the piston and forces the piston to move axially within the tank, forcing liquid propellant, confined in the tank to the front of the piston, to flow through the propellant tank's outlet, located in another dome shaped end at the other end of the tank, and, thence, through the propellant lines to the missile's engine.

The piston is rigid, convexly shaped so as to conform to the dome shaped wall at the outlet end of the tank, is of uniform thickness and is of a radius that fits within the cylindrical portion of the tank. With dome shaped tank inlet and outlet ends and a cylinder shaped section in between, if one visualizes progressing within the tank from the inlet end to the right along the axis of the tank, while remaining within the inlet dome, the radial distance, or radius from the axis of the tank to the tank side wall, gradually increases until one reaches the base of the dome, at which point the radius attains that of the cylindrical section. Thereafter the radius remains constant until one reaches the dome at the outlet end of the tank. As one progresses further and into the outlet dome, the radius again decreases. Hence in those prior propellant tanks, the piston cannot be initially positioned within the dome shaped inlet portion of the tank, where the radius is smaller than that of the piston, since the piston will not fit.

As a consequence, the cavity within the dome portion at the inlet side of the tank, to the left side of the piston, is unused; it is essentially wasted space that cannot be used to store propellant. As a further consequence the volume efficiency of the tank, the ratio of volume holding propellant to the volume of the tank as a whole, is not as great as desired. With the present invention a portion of the dome section is used to store propellant. Hence, propellant tanks of a given size constructed according to the present invention can carry more propellant than before and possesses greater volume efficiency, a decided advantage.

Prior propellant tanks of this type include two cylindrical shaped metal membranes or diaphragms, as variously termed, an outer one and an inner one of smaller diameter, essentially sleeve like in shape, with one located within the other along a common axis to define an annular region therebetween; and an end of each diaphragm was welded to the aforedescribed piston to form an annular end wall. The propellant is confined partially within that annular shaped region. The relationship between those diaphragms and the rigid piston was such that the axial movement of the piston pulled along the end of each diaphragm and forced each diaphragm to smoothly invert or roll over on itself in great part, a feature called rolling, much like the action that occurs when turning ones stocking inside out and pulling one's bedsheet down, effectively reducing the size of the annular cavity as the piston moves. That rolling action progresses until the piston contacts the inner dome shaped wall at the outlet end of the tank. The present invention incorporates the principles of rolling diaphragms.

Additionally in the foregoing prior propellant tank structure, the outside surface of the outer diaphragm is bonded to an overlying cylindrical metal wall, a liner, which provides structural support and a protective barrier for the more fragile outer diaphragm. That bond was accomplished with a releasible bonding agent, such as one containing Teflon particles. The bonding agent served to preclude the formation of any cracks or pockets between the liner and the underlying diaphragm, since any pressurized gas entering a pocket between the two members could distort or collapse the underlying diaphragm and thereby preclude proper operation. The pulling force created by the piston on the end of the outer diaphragm during piston movement essentially peels the diaphragm away from the overlying liner and allows the diaphragm to be smoothly rolled over on itself without cracking or kinking. Hence the foregoing propellant tank structure is referred to as a bonded rolling diaphragm tank. The foregoing bonded rolling diaphragm tank structure has achieved a degree of success and has been used successfully for over twenty years.

The present invention incorporates the structure of the bonded rolling diaphragms, the overlying metal cylinder overlying and protecting the outer diaphragm and the releasible bond between the outer diaphragm and the protective cylinder by simple modification to the geometry of and relationship of those elements to achieve a propellant tank of greater volume efficiency.

Accordingly, an object of the invention is to increase the volume efficiency of a missile propellant tank.

A further object of the invention is to employ bonded rolling diaphragms in a propellant tank of greater volume efficiency than heretofore available.

And an ancillary object of the invention is to reduce the number of separate pieces required to form a rolling diaphragm propellant tank.

SUMMARY

In accordance with invention, a liquid propellant tank of the rolling bonded diaphragm type having dome shaped inlet and outlet ends contains a flexible piston, one having a cross section profile that tapers in thickness between its central portion and an outer peripheral portion down to the thickness of said outer diaphragm, thereby defining a peripheral piston portion having greater flexibility than the central portion, and the piston and the outer diaphragm is a unitary one piece assembly, suitably formed of metal. The initial position of the piston is within the dome shaped inlet end, allowing propellant to be stored in at least a portion of the inlet end, thereby increasing the tank's propellant capacity.

The piston bears a cross section profile that tapers in thickness between its central portion and an outer peripheral portion, decreasing to the thickness of said outer diaphragm, thereby defining a peripheral piston portion having greater flexibility than its central portion.

In a more specific aspect, the outer diaphragm has a left end portion that is a segment of a dome in geometry. That segment extends into the dome shaped inlet region, mates with the dome shaped wall, and, along the outer edge, is integrally connected to the outer periphery of the piston.

Initially the piston is of a radius that is less than the radius of the cylindrical shaped central portion of the tank. During movement of the piston, an end portion of the outer diaphragm inverts from a concave shape to a convex shape and functions as a radial extension of the piston, effectively enlarging the radius of the piston.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DETAILED DESCRIPTION OF THE PREFERRED EMBODIMENTS

Figure 1:
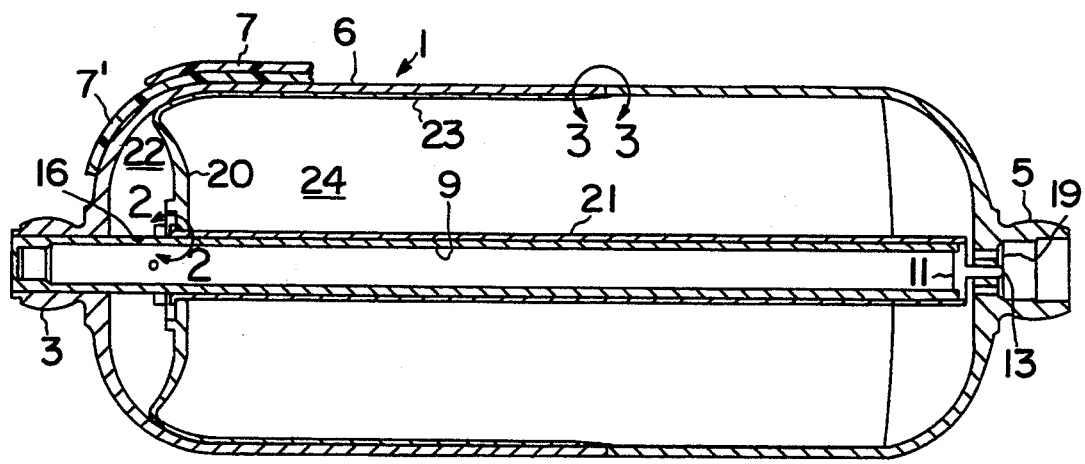
FIG. 1 presents an embodiment of the invention in section view.

Reference is made to FIG. 1 which shows an embodiment of the invention in side section view, it being understood that the elements are generally symmetrical about the center line. A tank 1 is generally tubular or cylindrical in shape with dome shaped or, more accurately, oblate spheroid shaped left and right ends, defining oblate spheroid shaped internal left and right end wall surfaces. Each of the left and right ends are formed as separate dome shaped caps that are welded or otherwise attached to the cylindrical portions of the tank, a conventional known practice. The outer cylindrical portion of the tank is defined by elements 6 and 23, the former being a metal cylinder or liner, as variously termed, and the latter being the outside surface of a member, that has multiple functions described in greater detail hereafter, formed of metal that contains a thicker portion to the right and a thinner diaphragm portion to the left of 3—3 in the figure.

Liner 6 fits over the thin portion of member 23, the outer diaphragm as later described, and abuts a ledge formed between the thick and thin portions of member 23 and is flush therewith. The tank contains an inlet port 3 and an outlet port 5 within the left and right end walls.

An overlying wrap of composite material 7, only partially illustrated, comprises an initial helical wrap followed by a hoop wrap, not separately illustrated in the figure. The wrap is wound about the central cylindrical portion of metal portion of the tank, much like winding string in a ball, to provide radial strengthening and is wrapped from the upper left side over to the lower right side, and so on, to strengthen the tank radially and axially. Although the foregoing wrap is not required in every propellant tank, the wrap is preferred and is included in the preferred embodiment.

Inside the tank, a hollow cylindrical pipe 9 extends axial of the internal chamber. The right end of the pipe is plugged by plug 11. The plug contains a protrusion 13, coaxial with the pipe, extending into an axial opening in the end wall adjacent propellant outlet port 5 to support the pipe.

A convexly shaped member 20, referred to as a piston, is integrally formed with diaphragm member 23 and contains a central opening through which the piston is mounted on pipe 9. The piston is essentially slideably mounted for travel one way along pipe 9. However, the piston is initially held in place on the pipe by a shear pin 10, not visible in the figure but illustrated and discussed hereafter in connection with FIG. 2, so that the piston will not be accidentally dislodged prior to actual use.

A cylindrical metal member, 21, referred to as the inner diaphragm, suitably formed of a thin metal such as aluminum, ensheathes the length of stand pipe 9, between piston 20 and the right end of the pipe where that diaphragm is welded to the pipe. The left end of diaphragm 21 is connected to piston 20. This connection is better illustrated in FIG. 2 to which brief reference is made.

Figure 2:
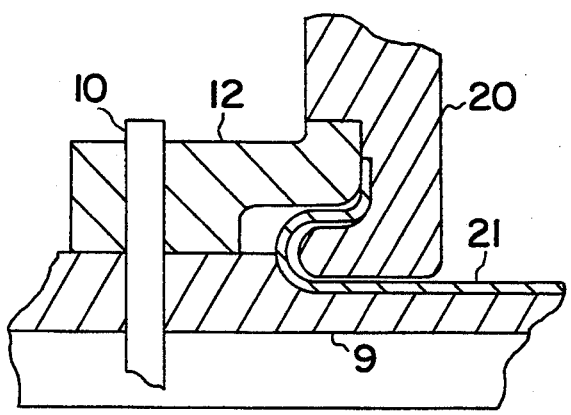
FIG. 2 illustrates section 2—2 in FIG. 1 showing in enlarged view the connection between piston and inner diaphragm elements.

As illustrated in FIG. 2 the end of diaphragm 21 is curled radially outwardly and around a rim portion of piston 20 and a cylindrical shaped metal weld ring 12 is welded to the back side of piston 20. A shear pin 10 is placed through aligned openings in the weld ring and pipe 9. The shear pin ensures that the piston does not move until the force on the piston exceeds a predetermined level.

Returning to FIG. 1, cylinder 21 is spaced from and coaxial with the thin portion of member 23, which serves as the outer diaphragm in this rolling diaphragm type tank. This outer diaphragm, also formed of a thin metal, such as aluminum, extends between piston 20 and location 3—3. Over the principal portion of the length of the outer diaphragm, the diaphragm is cylindrical in geometry. At the left hand side, where a segment of the outer diaphragm protrudes into the dome shaped internal cavity, the geometry is of a right segment of an oblate spheroid, essentially a dome shape that mates with and is releasibly bonded to the internal wall of the dome shaped inlet. Since the present embodiment incorporates the rolling diaphragm characteristics of the prior propellant tanks, the two diaphragms are deformable and, hence, can be rolled over upon themselves during operation. The thickness of the deformable inner and outer diaphragms can vary between 5 to 40 thousandth of an inch. The particular thickness will depend on the diameter of the tank and the particular metal used.

In accordance with the prior practice, the outer surface of the outer diaphragm 23 is also releasibly bonded to the inner surface of the overlying cylindrical liner 6 and to the dome shaped inlet with a releasible bonding agent, such as a metal bonding agent containing Teflon particles known in prior propellant tanks of this type.

Figure 3:
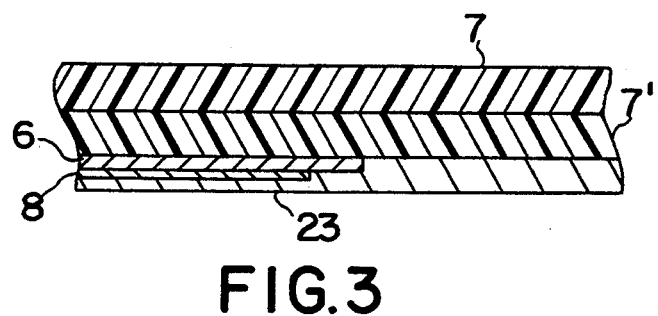
FIG. 3 illustrates section 3—3 in FIG. 1 in enlarged view showing the juncture between other elements of the embodiment of FIG. 1.

Brief reference is now made to FIG. 3 which shows in close up view the section 3—3 of FIG. 1. This better shows the relationship between composite hoop wrap 7, helix wrap 7′, liner 6, which serves as a portion of the tank's outer wall, and diaphragm 23. The bonding agent, which releasibly bonds the diaphragm 23 to the liner 6, is represented as element 8 in the figure. The liner provides structural support and a protective barrier for the relatively thin outer diaphragm. The bonding agent eliminates any voids between the liner and the outer diaphragm. Should any voids be permitted in that region, pressurized gas could enter the space between the liner and diaphragm during operation and thereby cause the relatively fragile outer diaphragm to collapse or distort as would defeat normal rolling diaphragm action.

FIG. 3 also shows more clearly the varying thickness of member 23, containing the outer diaphragm portion, which is stepped up in size as one proceeds to the right. Member 23 contains a thickened portion that serves as a relatively rigid outer wall for the propellant tank to the right of the connection at 3—3 in FIG. 1, and forms a circumferentially extending ledge in which to seat cylindrical liner 6. The liner has its outer surface in flush fit with the portion of member 23 that serves as an outer wall and is in telescoping relationship to the portion of that member that serves as the outer diaphragm. A slight ledge is also formed in member 23 to permit space between liner 6 and diaphragm 23 for application of the bonding agent.

As becomes apparent later in this description, the deformation or rolling of diaphragm 23, does not extend past this axial location on the tank, since movement of piston 20 along pipe 9, which causes the rolling action, is limited in axial extent to an abutting position against the dome shaped outlet wall.

Returning again to FIG. 1, the piston is positioned initially in a region at the left side of the propellant tank in a region therein in which the propellant tank has a decreased radius, according to the generally domed shape of the left end, within the dome shaped inlet end.

It is seen that the inner diaphragm 21 and member 23, including the outer diaphragm, defines an annular propellant confining region 24 bordered on the left side by piston 20 and on the right side by the domed shaped internal wall of outlet 5. Likewise another annular cavity 22 is formed between the backside of piston 20 and the dome shaped inlet end wall. During operation annular cavity 22 receives gas under pressure, but otherwise the cavity is essentially unused space since this cavity does not hold propellant.

In profile the piston's thickness is greatest at the central portion and tapers down in thickness as one proceeds radially outwardly from the central axis of the assembly and forms a generally convex piston shape with a bend at the peripheral edge. The peripheral edge of the piston attains the thickness and radius of outer diaphragm 23 and merges integrally with that member in a smooth curve. As shown piston 20 and outer diaphragm 23, though separately identified, are essentially formed in a single piece and are integral.

At the left end the passage in pipe 9 is open to inlet port 3. Openings 15 and 17 in the outer walls of pipe 9 to form passages for gases applied at the inlet port and permit those gases to enter region 22 to the left of piston 20. Several openings 19 provide passage between the outer annular region 24 and propellant outlet port 19.

Figure 4:
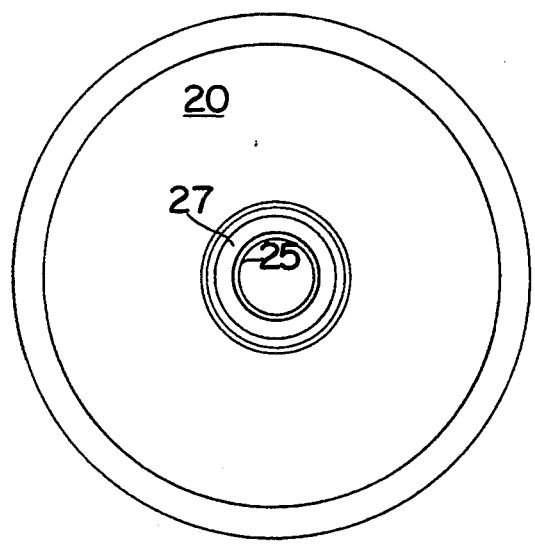
FIG. 4 is a front view of a piston used in the embodiment of FIG. 1.
Figure 5:
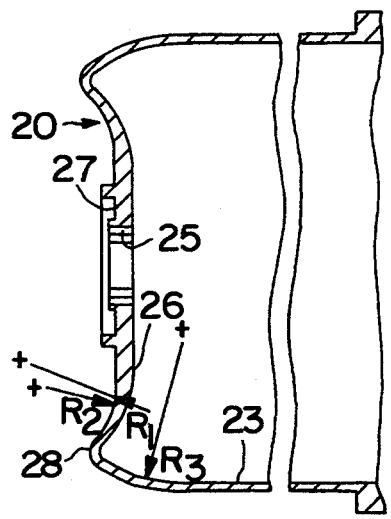
FIG. 5 is a side section view of the piston element used in the embodiment of FIG. 1.

Reference is made to FIGS. 4 and 5, which presents in enlarged scale a rear view of the piston and the integrally formed piston and outer diaphragm in cross section view, respectively. The central circular opening 25 is sufficient in diameter to fit over the inner diaphragm 21 and pipe 9. The annular area 27 of the piston is shown in which the end of diaphragm 21 is flared. The piston is thickest at the central area. At about point 26 the thickness decreases progressively to about location 28 where it is of the same thickness as the integral diaphragm. The diaphragm is convex in shape to that point and then forms a slight bend to reverse direction whereby it connects with or merges into the oblate spheroidal or dome shaped segment of the outer diaphragm 23.

Certain radii, R1, R2 and R3, are represented in FIG. 5 to help graphically define a specific taper for the profile of the piston configuration illustrated. In one specific example the thickness of the central portion of the piston, Tc, was approximately seven times greater than the thin portion, Te, at the piston's edge. In that example R3=(1.80) R2 and R1=(1.43) R2. The center for the arc for R2 in the illustration of FIG. 5 being located at A2 behind the front face of the piston and D2 below the axis and with the corresponding centers of the arcs for R1, A1 and D1, being located relatively at (1.2) A2 behind the piston's front face and 0.78 D2 below the axis; that for R3, A3 and D3, respectively, being located relatively at 0.52 A2 forward of the front face of the piston and 0.72 D2 below the axis.

The piston and outer diaphragm are formed in the unitary assembly by conventional technique in which an aluminum piece is mounted upon an appropriately shaped mandrel and spun to shape. Then the openings and surface configuration illustrated to the left side in the figure are formed by appropriate machining operations. Thereafter the unitary assembly are assembled to the remaining elements of the propellant tank as earlier described using known practices.

In operation, the novel propellant tank elements function according to essentially the same principals as the prior propellant tank structures. High pressure gas enters inlet 3, through pipe 9, openings 15 into cavity 22 to apply force on the left side of piston 20. The piston, responding to that force, breaks the shear pin 10 and commences to slide along the axis of pipe 9 to the right, reducing the size of region 24 and forcing confined propellant, either liquid or gel, out of the tank via openings 19 and outlet 5.

Since the central portion of the piston is essentially rigid the piston pulls along and deforms the inner diaphragm 21, rolling it over upon itself, much like one draws down a bedsheet. As the piston proceeds to travel along the pipe it also pulls outer diaphragm 23, tearing the spheroidal edge from its bonded attachment to liner 6. The concavely shaped outer periphery is thinner than the central portion of the piston and integrally connected to the oblate spheroidal segment of the outer diaphragm 23. As shown in FIG. 1, the radius of the central portion of the tank is greater than the radius of piston 20, the latter being positioned initially within the left side dome portion of the tank, where the radial distance from the axis to the outer wall is less than the radius in the central portion of the tank. Thus a portion of what was the outer diaphragm is transformed to and now becomes a portion of the piston, as the piston travels into the cylindrical portion of the tank. Moreover, a portion of that outer diaphragm portion becomes somewhat convex conforming to the convex curvature of the piston's face. Effectively the radius of the piston increases. As the piston continues axial travel along the pipe, addition portions of the outer diaphragm are torn away from the bond and are rolled over as in the prior tanks. It is found that, except for the portion of the outer diaphragm that transforms into a portion of the piston, the flexible piston assembly smoothly rolls over the outer and inner diaphragms. Neither diaphragm cracks, as would allow propellant to leak out of region 24 into region 22 and become unusable.

The piston reaches its limit of travel when the face of the piston abuts against the inner surface of the dome shaped outlet end of the propellant tank. Hence, as in the prior propellant tanks, only a portion of the length of inner diaphragm 21 and member 23 are rolled over. Ideally, the face of piston 20 should conform to the dome shaped internal wall of the outlet as would leave minimal space between the two, thereby minimizing the amount of propellant remaining in the tank upon completion of the rolling operation.

Figure 6:
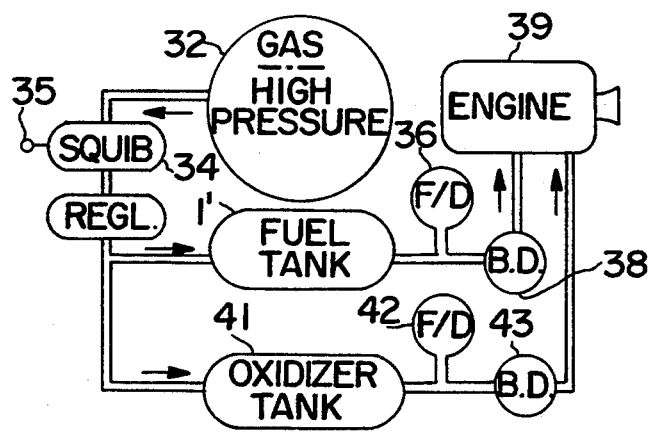
FIG. 6 is a block diagram of a propulsion system which incorporates the embodiment of FIG. 1.

The tank is intended for use in a propulsion system presented in FIG. 6 to which reference is made. The figure symbolically illustrates two identical propellant tanks 1', for the fuel, and 41 for the oxidizer, in relation to the principal elements of a missile propulsion system. A tank 32, containing gas, such as compressed air under high pressure, suitably 10,000 psi as example, is connected to the inlet port of propellant tank 1' via a valve or squib 34, the latter closing tank 32 until the gas is needed, and a pressure regulator 33. Fill and drain valves 36 and 42, connected to the outlet of the respective propellant tanks, are closed so as to prevent escape of propellant through those valves. The fill and drain valves are opened to allow propellant to be loaded into the tanks or drained and is normally closed at this stage so as not to shunt the propellant from the main supply line to the engine. The tank outlets are connected by the propellant supply lines to respective burst disks 38 and 43 and from there to the engine 39 and the engine controls. Except for the improved propellant tank, all of the elements in such system are known and form part of prior propulsion systems.

In preparation for use, squib 34 seals gas tank 32 prior to deployment of the missile. Hence, the gas line from the squib to the propellant tank inlet is essentially at atmospheric pressure. In operation, when the missile is to be fired, controls, not illustrated, applies a signal over squib input 35 to fire the squib, which thereby opens and allows gas from tank 32 to enter regulator 33, which reduces the gas pressure to and maintains the gas at a predetermined pressure level, and thence allows the gas into the inlets of propellant tanks 1' and 41. Considering tank 1', the gas is at high pressure and is applied against one side of the internal piston, earlier illustrated in FIG. 1, which may be referred to temporarily and drives piston 20. This causes the piston to shear the shear pin, which held the piston in a fixed position during storage, and the piston commences lateral movement on pipe 9 along the axis of the tank. The piston in turn applies force to the liquid propellant confined in annular region 24, raising the pressure of the confined propellant from atmospheric pressure levels to about 100 psi or higher, raising the pressure in the propellant tank and propellant lines through drain and fill valve 36 to burst disk 38. The burst disk, a protective device which served as another barrier to propellant flow during the quiescent state, then bursts and allows the fuel to flow to engine 39. A like action occurs in the companion propellant tank 41, which allows the oxidizer to flow to the engine, where both oxidizer and fuel are consumed in the hypergolic reaction between the two propellants.

In most missiles, the engine consumes the propellant at essentially a steady rate. However in some systems, engine controls may temporarily stop the consumption of propellant or may modulate it as desired, but no additional action is required of the propellant tank.

The foregoing tank permits storage of a greater of volume of propellant in a given size tank than prior tank designs. In a practical embodiment of a tank that is fifteen inches in length and six inches in diameter, a twenty percent increase in propellant volume is achieved over bonded rolling tanks of the prior construction. Larger or smaller increases comparatively can be achieved in tanks of other sizes. Although the numerical value of the increase may vary, in each instance an increase is achieved.

From the foregoing description those skilled in the art will also recognize that the novel propellant tank has a lower part count than the prior propellant tanks and, hence, any incidental advantage accruing to lower parts inventory and the attendant cost advantage is achieved with the disclosed structure.

The foregoing description of the preferred embodiment of the invention is sufficient in detail to enable one skilled in the art to make and use the invention. However, it is expressly understood that the details of the elements which are presented for the foregoing enabling purpose are not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. In a propellant tank for a rocket propulsion engine, said tank being of the rolling diaphragm type containing an outer tubular diaphragm and an inner tubular diaphragm, with said inner tubular diaphragm being positioned within said outer tubular diaphragm and oriented coaxially therewith on a common axis to define a propellant cavity therebetween, and a piston coupled to an end of said diaphragms, wherein said diaphragms are rolled over responsive to travel of said piston along said common axis to contract the size of said propellant cavity and force propellant therefrom through an outlet of said tank, the improvement therein wherein said piston comprises: a flexible piston, with said flexible piston and said outer diaphragm being formed in a one piece unitary integral assembly.

2. The invention as defined in claim 1, wherein said outer diaphragm contains an end portion having the geometry of a segment of an oblate spheroid with said end portion being connected integrally to said piston.

3. A propellant storage reservoir for a missile propulsion system, comprising:
    a composite wrapped pressure tank defining an internal cavity, said tank including an inlet port to said cavity, located at an end of said tank, and an outlet port to said cavity located at an opposed end of said tank and a cylindrical metal wall extending at least partially along the length of said tank;
    a hollow pipe axially extending through the center of said cavity, said pipe having a closed end located proximate said outlet port and another open end extending through said inlet port;
    a first metal diaphragm of cylindrical shape located within said cavity ensleeving the peripheral outer walls of said pipe, at least a portion of said first metal diaphragm being deformable;
    a second metal diaphragm disposed in said cavity surrounding the peripheral outer walls of said first diaphragm and being coaxial therewith, at least a portion of said second metal diaphragm being deformable; said second metal diaphragm being radially larger than said first metal diaphragm to define an annular cavity therebetween for confining propellant; said second metal diaphragm including a left end portion having the geometry of an oblate spheroid;
    passage means for connecting said annular cavity to said outlet port to permit propellant to pass to said outlet port;
    said second deformable diaphragm being located underlying at least a portion of said cylindrical metal wall;
    bonding means for releasibly bonding the outer wall of said second diaphragm to the inner wall of said cylindrical metal wall;
    a metal piston connected between said inner and outer diaphragms to define an impervious end wall facing said inlet side of said tank, said piston being profiled in thickness and having a flexible characteristic at least along an outer periphery thereof;
    said piston having a central passage for slidably mounting said piston on said pipe and being positioned within said inlet dome shaped region of said propellant tank;
    said piston further being integrally formed in one piece with said second deformable diaphragm, wherein a peripheral edge of said piston merges into said end portion of said second diaphragm;
    said pipe including a passage into said cavity defined between said inlet end and said piston to permit a gas passage from said inlet port through said pipe to the back side of said piston;
    frangible stop means connecting said piston to said pipe to hold said piston in a fixed position along said pipe axis and prevent sliding movement, said frangible stop means being responsive to a predetermined pressure level on one side of said piston for fracturing to release said piston for sliding movement along the axis of said pipe; and
    said piston having a strength sufficient to roll over a portion of the length of said first and second metal diaphragms to reduce the size of said annular cavity and to move along the axis of said pipe, responsive to a predetermined gas pressure in said inlet port, whereby propellant confined in said annular cavity is dispensed from said outlet port.

4. The invention as defined in claim 3, wherein said piston further comprises:
    a convexly shaped central portion; and
    a concavely shaped peripheral portion.

5. The invention as defined in claim 3, wherein said piston further comprises:
    a central portion of a predetermined thickness;
    a peripheral portion of a second predetermined thickness, with said second predetermined thickness being less than said first predetermined thickness; and
    a bend in said peripheral portion of said piston circumferentially extending about the outer edge of said piston for connection to said second deformable diaphragm.

6. The invention as defined in claim 3, wherein second deformable diaphragm is of a first selected thickness and wherein said piston further comprises:
    a central portion of a predetermined thickness; and
    a peripheral portion of a second predetermined thickness, with said second predetermined thickness being less than said first predetermined thickness and substantially equal in thickness to said selected thickness of said second deformable diaphragm.

7. The invention as defined in claim 3, wherein said piston further comprises the cross section profile illustrated in FIG. 5.

8. A propellant storage reservoir for a missile propulsion system, comprising:
    a tank defining an internal cavity, said tank including an inlet port to said cavity and an outlet port to said cavity;
    a hollow pipe axially extending through the center of said cavity, said pipe having one end located proximate said outlet port and another end extending through said inlet port;
    a first metal diaphragm of cylindrical shape located within said cavity ensleeving the peripheral outer walls of said pipe, at least a portion of said first metal diaphragm being deformable;

a second metal diaphragm of cylindrical shape disposed in said cavity surrounding the peripheral outer walls of said first deformable diaphragm and being coaxial therewith, at least a portion of said second metal diaphragm being deformable;

said first and second metal diaphragms having different diameters to define an annular cavity therebetween for confining liquid propellant;

passage means for connecting said annular cavity to said outlet port to permit propellant to pass to said outlet port;

a metal piston connected between said inner and outer diaphragms to define an impervious end wall facing said inlet port and an end wall to said annular cavity, said piston having a flexible characteristic at least along an outer periphery thereof for connection with said second deformable diaphragm;

said piston having a central passage for slidably mounting said piston on said pipe and being positioned within said inlet dome shaped region of said propellant tank;

said piston further being integrally formed with said second deformable diaphragm in a one piece unitary assembly;

said pipe including an opening external of said cavity and a second opening internal of said cavity into a region between said inlet port and said piston to permit passage of pressurized gas from said inlet port through said pipe to the back side of said piston; and said piston having a strength sufficient to roll-over a portion of the length of said first and second metal diaphragms to reduce the size of said annular cavity and to move along the axis of said pipe, responsive to a predetermined gas pressure applied to said inlet port, whereby liquid propellant confined in said annular cavity is dispensed from said outlet port.

9. In a propellant storage tank of the bonded rolling diaphragm type for a missile propulsion system, said tank being characterized by a propellant outlet, an internal outer metal diaphragm and an inner metal diaphragm coaxially positioned within the outer diaphragm to define an annular propellant containing region therebetween, said region being bounded on one side by a pressure drivable piston with said piston being adapted to roll over said diaphragms during operation to continuously reduce the size of said annular cavity and force propellant to exit through the propellant outlet, an outer cylindrical wall overlying at least a part of the outer diaphragm, with at least a portion of said outer diaphragm being releasibly bonded to the inner surface of said outer cylindrical wall; the improvement therein wherein said piston comprises: a cross section profile that tapers in thickness between the central portion and the outer peripheral portion to the thickness of said outer diaphragm to define a peripheral portion of said piston having greater flexibility than said central portion; wherein said outer diaphragm includes an end portion comprising a dome shaped segment; and wherein said outer diaphragm and said piston comprise a unitary one piece integral assembly.

* * * * *